United States Patent [19]
Johnson et al.

[11] Patent Number: 5,768,885
[45] Date of Patent: Jun. 23, 1998

[54] REGENERATIVE PISTON LIQUID PROPELLANT ROCKET MOTOR

[75] Inventors: Darrin L. Johnson, Fountain Hills, Ariz.; Donald R. Lauritzen, Hyrum, Utah

[73] Assignee: Autoliv ASP, Inc., Ogden, Utah

[21] Appl. No.: 760,011

[22] Filed: Dec. 3, 1996

[51] Int. Cl.$^6$ ........................................... F02K 9/44
[52] U.S. Cl. .................................... 60/204; 60/259
[58] Field of Search .......................... 60/39.76, 39.81, 60/204, 247, 259

[56] References Cited

U.S. PATENT DOCUMENTS

| | | | |
|---|---|---|---|
| 3,310,938 | 3/1967 | Samms | 60/259 |
| 3,668,868 | 6/1972 | Krzycki | 60/259 |
| 3,690,255 | 9/1972 | Vass et al. | 102/39 |
| 3,889,703 | 6/1975 | Keathly | 137/67 |
| 3,893,294 | 7/1975 | Bruun et al. | 60/39.46 |
| 4,069,664 | 1/1978 | Ellion et al. | 60/258 |
| 4,100,836 | 7/1978 | Hofmann | 89/7 |
| 4,258,546 | 3/1981 | Stratton | 60/259 |
| 4,269,107 | 5/1981 | Campbell, Jr. | 89/7 |
| 4,326,377 | 4/1982 | Jaqua | 60/247 |
| 4,805,399 | 2/1989 | McKevitt | 60/200.1 |
| 5,060,973 | 10/1991 | Giovanetti | 280/736 |
| 5,291,731 | 3/1994 | Duva | 60/39.6 |
| 5,481,977 | 1/1996 | Evans et al. | 102/328 |
| 5,487,561 | 1/1996 | Mandzy et al. | 280/741 |
| 5,639,117 | 6/1997 | Mandzy et al. | 280/741 |

Primary Examiner—Louis J. Casaregola

[57] ABSTRACT

A regenerative liquid propellant rocket motor including a body having an integrally formed central tube. A primary combustion chamber is disposed in the body. A secondary combustion chamber is formed by the central tube of the body. A reservoir of liquid propellant is disposed in the body. A regenerative piston is slidably disposed in the body for delivering the liquid propellant to the primary and secondary combustion chambers. The piston includes a plurality of injection ports for injecting the liquid propellant. An ignitor is disposed in the body for initiating combustion of the liquid propellant. A nozzle is formed at a free end of the central tube for producing thrust, wherein upon ignition of the ignitor combustion occurs in the primary combustion chamber driving the piston into the liquid propellant reservoir and the liquid propellant is injected into the primary combustion chamber to produce combustion products which are channeled into the secondary combustion chamber and expanded through the nozzle.

7 Claims, 2 Drawing Sheets

REGENERATIVE PISTON LIQUID PROPELLANT ROCKET MOTOR

This application is related to copending applications Ser. No. 08/770,380, entitled "Injection Termination Feature"; Ser. No. 08/770,382, "Anti-Rupture Method For Liquid Propellant Gas Inflator"; Ser. No. 08/781,960, entitled "Liquid Propellant Inflator Having a Crowned Encapsulation and a Pre-formed Regenerative Piston Chamber"; Ser. No. 08/768,146, entitled "Regenerative Piston Engine For Combustion of Liquid Monopropellant"; Ser. No. 08/806,457, entitled "Adaptive Regenerative Inflator"; Ser. No. 08/759,995 entitled "Regenerative Monopropellant Airbag Inflator"; all assigned to the assignee of the present invention.

BACKGROUND OF THE INVENTION

1. Field of the Invention

The present invention relates to a liquid propellant rocket motor, and more particularly, to a rocket motor having a regenerative piston for injecting liquid propellant into a combustion chamber of the motor in a regenerative cycle.

2. Description of the Related Art

Known rocket engines for space applications have commonly been fueled with a liquid propellant. Liquid propellant fueled rocket engines offer improvements over traditional solid rocket motors which are typically not reusable and whose burn rate control is limited to propellant formulations and grain geometry.

Prior art liquid propellant fueled engines often use a pumping system to inject propellant into the combustion chamber. These systems are highly mechanical and complex. See U.S. Pat. No. 4,258,546.

Other technologies, for example, vehicle safety restraint systems and ammunition deployments, are known to use regenerative liquid propellant feed systems. However, this regenerative technology has not been applied to rocket engines in a simple reliable manner.

U.S. Pat. No. 3,690,255 discloses a controlled regenerative cycle for delivering liquid propellant for a cartridge bomb ejector. Although the regenerative fluid delivery system is adequate for the disclosed ammunition application, means are not provided for producing the combustion necessary to produce enough thrust for space applications. The cartridge does not utilize a central flow mixing area and secondary combustion chamber which produces higher combustion efficiency by mixing unburned propellant and intermediate combustion products, as in the present invention which is able to concentrate the heat to assist in complete combustion.

U.S. Pat. No. 4,326,377 discloses a propellant injector for a liquid rocket engine. The rocket engine operates via a complex, multi-part piston which delivers liquid propellant from a small fuel injection chamber. The fuel injection chamber is constantly replenished from a remote source of liquid propellant. Such systems are costly and complex. Moreover, the above device utilizes a bipropellant which requires oxidation in an injector chamber.

SUAMMARY OF THE INVENTION

An object of the present invention is to provide a motor for a thruster on a space vehicle which provides a liquid propellant in a reusable motor without separate high pressure injection pumps.

Another object of the present invention is to provide a light weight, low cost, highly reliable regenerative liquid propellant rocket motor. Since the motor of the present device utilizes only a single movable piston, manufacturing costs are decreased, while reliability is increased.

A further object of the present invention is to provide a liquid propellant rocket motor, the thrust of which can be tailored by adjusting the mass flow control via the fuel injection rate in a simple, reliable method.

In accomplishing these and other objectives of the present invention, there is provided a regenerative liquid propellant rocket motor including a body having an integrally formed central tube. A primary combustion chamber is disposed in the body. A secondary combustion chamber is formed by the central tube of the body. A reservoir of liquid propellant is disposed in the body. Regenerative piston means are slidably disposed in the body for delivering the liquid propellant to the primary and secondary combustion chambers. The piston means includes a plurality of injection means for injecting the liquid propellant. Ignitor means are disposed in the body for initiating combustion of the liquid propellant. Nozzle means are formed at a free end of the central tube for producing thrust, wherein upon ignition of the ignitor means combustion occurs in the primary combustion chamber driving the piston means into the liquid propellant reservoir and the liquid propellant is injected into the primary combustion chamber to produce combustion products which are channeled into the secondary combustion chamber and expanded through the nozzle means.

Other features and advantages of the present invention will become apparent from the following description of the invention which refers to the accompanying drawings.

DETAILED DESCRIPTION OF THE PREFERRED EMBODIMENTS

Figure 1:
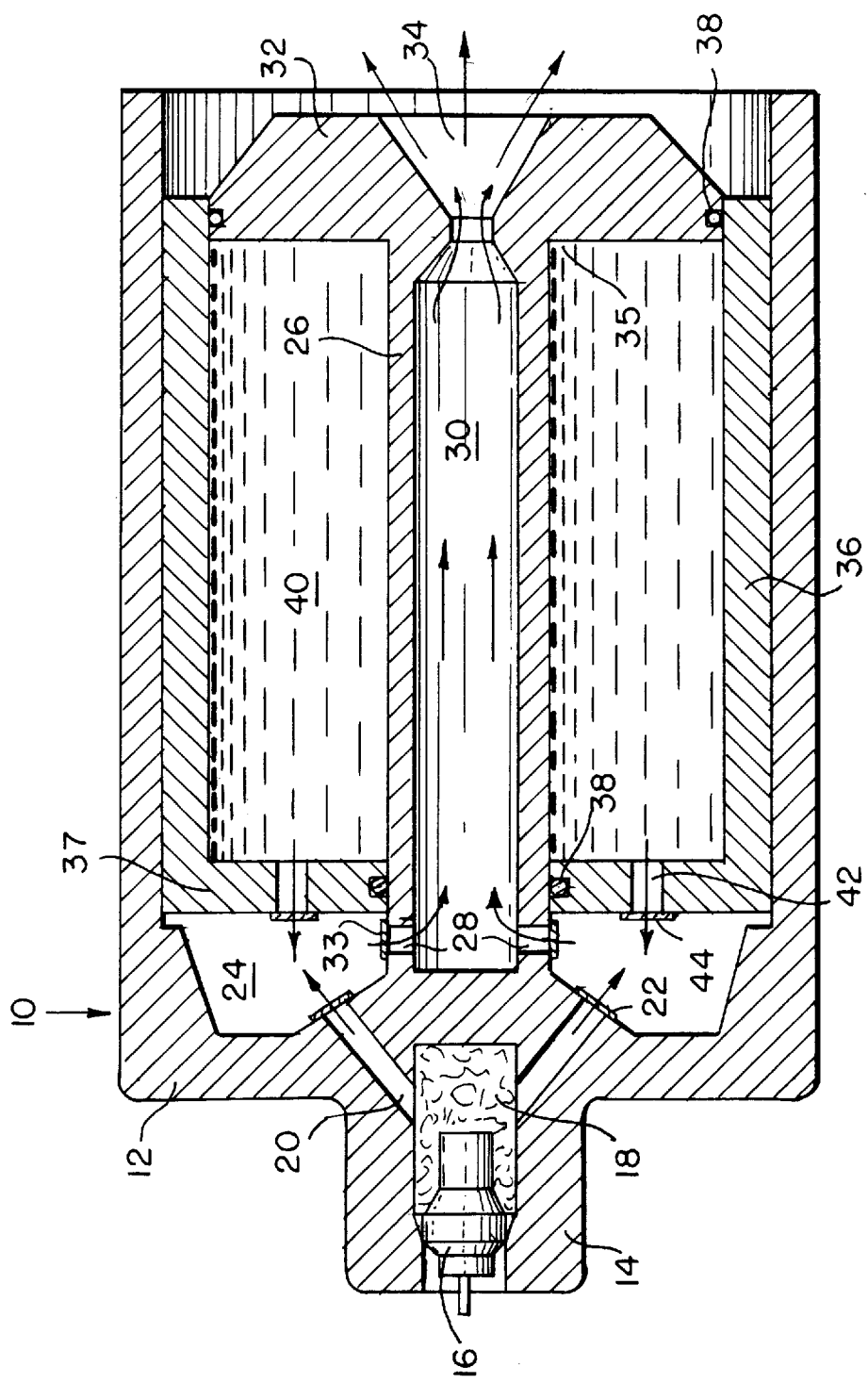
FIG. 1 is a cross-section of a liquid propellant rocket engine according to the present invention.

Referring to FIG. 1, the rocket motor assembly of the present invention is indicated by the reference numeral 10. Motor 10 includes a body 12 having a stud 14. Body 12 can be made of a lightweight material, such as, aluminum. Stud 14 includes a bore which receives a squib or initiator 16. An amount of ignition material 18 is also disposed in the bore of stud 14 in communication with squib 16.

As will be described further herein, ignition material 18 ignites a liquid propellant within a primary combustion chamber 24. The liquid propellant is a monopropellant such as Han/Tean. A pair of passages 20 covered by a layer of burst foil 22 extend through stud 14 into combustion chamber 20.

Body 12 includes a central tube 26 formed integrally with stud 14 and the remaining portion of body 12. Tube 26 forms a secondary combustion chamber 30. Apertures 28 formed in tube 26 provide entrance of the combusted material from primary chamber 24 to secondary chamber 30. Apertures 28 are also covered with a layer of burst foil 33 which will burst when a certain pressure is reached within chamber 24. Secondary combustion of the combusted material occurs within chamber 30.

Tube 26 includes a head 32 formed on a free end 35. Head 32 includes a converging and diverging nozzle 34 formed therein in communication with secondary combustion chamber 30. The design of the nozzle allows for various large expansion ratios. Moreover, the center supported nozzle simplifies construction and minimizes weight.

A skirted piston 36 is slidably positioned on tube 26 of body 12. It should be appreciated that a T-shaped piston could also be used, with the appropriate change in design of the tube to accommodate the T-shaped piston.

Piston 36 accommodates sealing rings 38, for example, a gasket or o-ring, to form an enclosed liquid propellant reservoir 40 between the piston and tube 26. Since the liquid propellant is corrosive, the piston can be made of a compatible material, such as Teflon or the piston and motor body can be provided with a non-corrosive coating. Alternatively, the liquid propellant could be enclosed in a baggy which is burst by the piston prior to injection.

Piston 36 includes a face 37 having a plurality of injection ports 42 covered by a layer of burst foil 44. Ports 42 provide a constant injection rate of liquid propellant into primary combustion chamber 24.

The operation of the rocket motor of the present invention is as follows. Upon ignition from a remote source (not shown), squib 16 fires igniting material 18. Gas and particles travel through passages 20 bursting foils 22 into primary combustion chamber 24 where combustion of the mixture causes an increase in pressure within the chamber. Because the surface area of piston 36 facing chamber 24 is larger than the surface area of the piston facing liquid propellant reservoir 40 a pressure differential across the piston will drive the propellant into the combustion chamber moving the piston rightward into reservoir 40, as viewed in the drawing figure. As piston 36 is driven into the liquid propellant reservoir an initial amount of the liquid propellant is injected through ports 42, bursting foils 44, into chamber 24. This initial quantity of liquid propellant combusts causing the pressure within chamber 24 to increase further. The energy generated by the combustion of the initial quantity is used to drive the piston further into the liquid propellant reservoir and additional liquid propellant is injected into the combustion chamber.

The combusted liquid causes the pressure within chamber 24 to increase further, bursting foils 33 and the combusted liquid enters secondary combustion chamber via apertures 28. Further combustion of the mixture occurs in secondary chamber 30 and the produced gas mixture travels through nozzle 34 creating the thrust necessary to drive the device. Apertures 28 cause gas and liquid particle impingement and mixing to enhance combustion efficiency.

Figure 2:
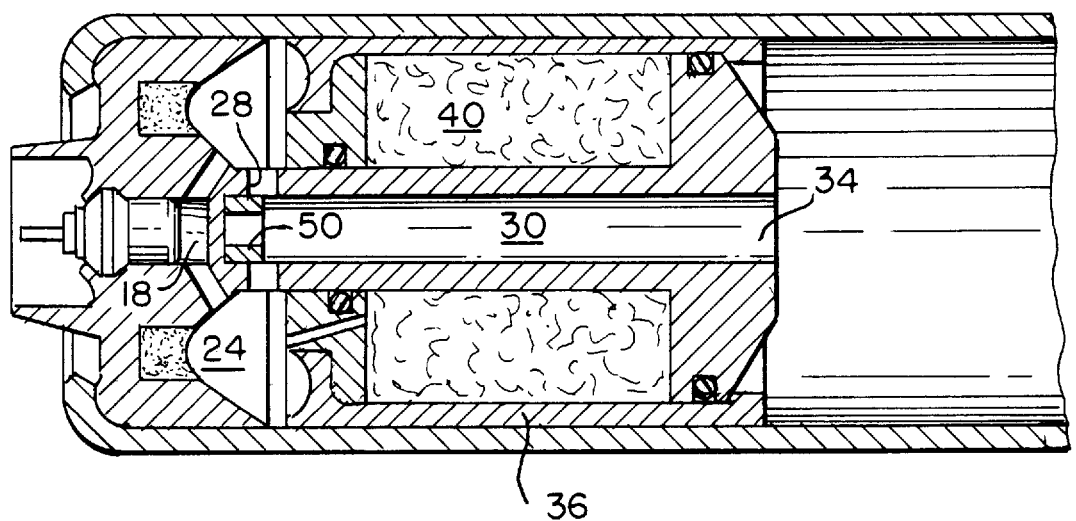
FIG. 2 is another embodiment of a liquid propellant rocket engine which includes a movable sleeve for restricting the flow into the secondary combustion chamber.

Referring to FIG. 2, the injection rate can be varied by varying the combustion pressure can by controlling the flow area of apertures 28. A mechanical sleeve 50 can be located within secondary combustion chamber 30. Sleeve 50 is movable to restrict the flow area of ports 28. Known mechanical means can be provided to move sleeve 50. By restricting the flow area through ports 28 gas mass will flow at a higher rate through the smaller port because the gas is at a higher density due to the higher pressure. However, the optimum performance will occur when the nozzle throat at the end of chamber 30 controls the operating pressure at the maximum constant design pressure.

Because the liquid propellant mixing and combusting within primary chamber 24 will drive the piston further into the liquid propellant reservoir, the process will regenerate until all of the liquid propellant has been consumed.

The rocket motor of the present invention is reusable by simply refurbishing the liquid propellant and appropriate ignition means. However, since the motor of the present invention does not have restart capabilities, is not intended to be reused during flight. Moreover, the rocket motor has an easily tailorable performance by using pintle or other techniques to adjust the flow rates through the injection or exhaust orifices during flight.

In summary, the regenerative piston is used to pump the propellant into a combustion chamber. Combustion products are channeled into a central secondary combustion chamber to maximize efficiency of the combustion process. The combustion products are finally expanded through a converging diverging nozzle to produce thrust.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A regenerative liquid propellant rocket motor comprising:
    a body including an integrally formed central tube;
    a primary combustion chamber disposed in the body;
    a secondary combustion chamber formed by the central tube of the body;
    a reservoir of liquid propellant disposed in the body;
    regenerative piston means slidably disposed in the body for delivering the liquid propellant to the primary and secondary combustion chambers, the piston means including a plurality of injection means for injecting the liquid propellant;
    ignitor means disposed in the body for initiating combustion of the liquid propellant; and
    nozzle means formed at a free end of the central tube for producing thrust, wherein upon ignition of the ignitor means combustion occurs in the primary combustion chamber driving the piston means into the liquid propellant reservoir and the liquid propellant is injected into the primary combustion chamber to produce combustion products which are channeled into the secondary combustion chamber and expanded through the nozzle means.

2. The regenerative rocket motor of claim 1, wherein the primary and secondary combustion chambers communicate via a plurality of apertures.

3. The regenerative rocket motor of claim 1, wherein the piston means comprises a skirted piston slidably disposed on the central tube of the body.

4. The regenerative piston of claim 3, wherein the liquid propellant reservoir is enclosed by the piston and the central tube.

5. The regenerative piston of claim 1, wherein the nozzle means comprises a converging diverging nozzle.

6. The regenerative piston of claim 1, wherein injection means comprises a plurality of injection ports disposed in a face of the piston, the liquid propellant being injected into the primary combustion chamber through the injection ports.

7. A method of regeneratively injecting liquid propellant into a plurality of combustion chambers of a liquid propellant rocket motor comprising the steps of:

movably positioning a piston within a body of the rocket motor, the body including an integrally formed central tube, a primary combustion chamber disposed in the body, a secondary combustion chamber formed in the central tube, and a reservoir of liquid propellant;

driving the piston into the liquid propellant reservoir;

injecting the liquid propellant into the primary and secondary combustion chambers; and combusting the liquid propellant in the primary and secondary combustion chambers, the central tube including a nozzle formed on an end thereof, wherein combustion occurs in the primary combustion chamber driving the piston into the liquid propellant reservoir and the liquid propellant is injected into the primary combustion chamber to produce combustion products which are channeled into the secondary combustion chamber and expanded through the nozzle.

* * * * *